Aug. 29, 1933.  P. E. AMANN  1,925,025
PROCESS AND APPARATUS FOR ACCURATELY CUTTING AND RECTIFYING GEARS
Filed May 25, 1932   6 Sheets-Sheet 1

Inventor:
Paul Emile Amann
By Mauro + Lewis
Attorneys

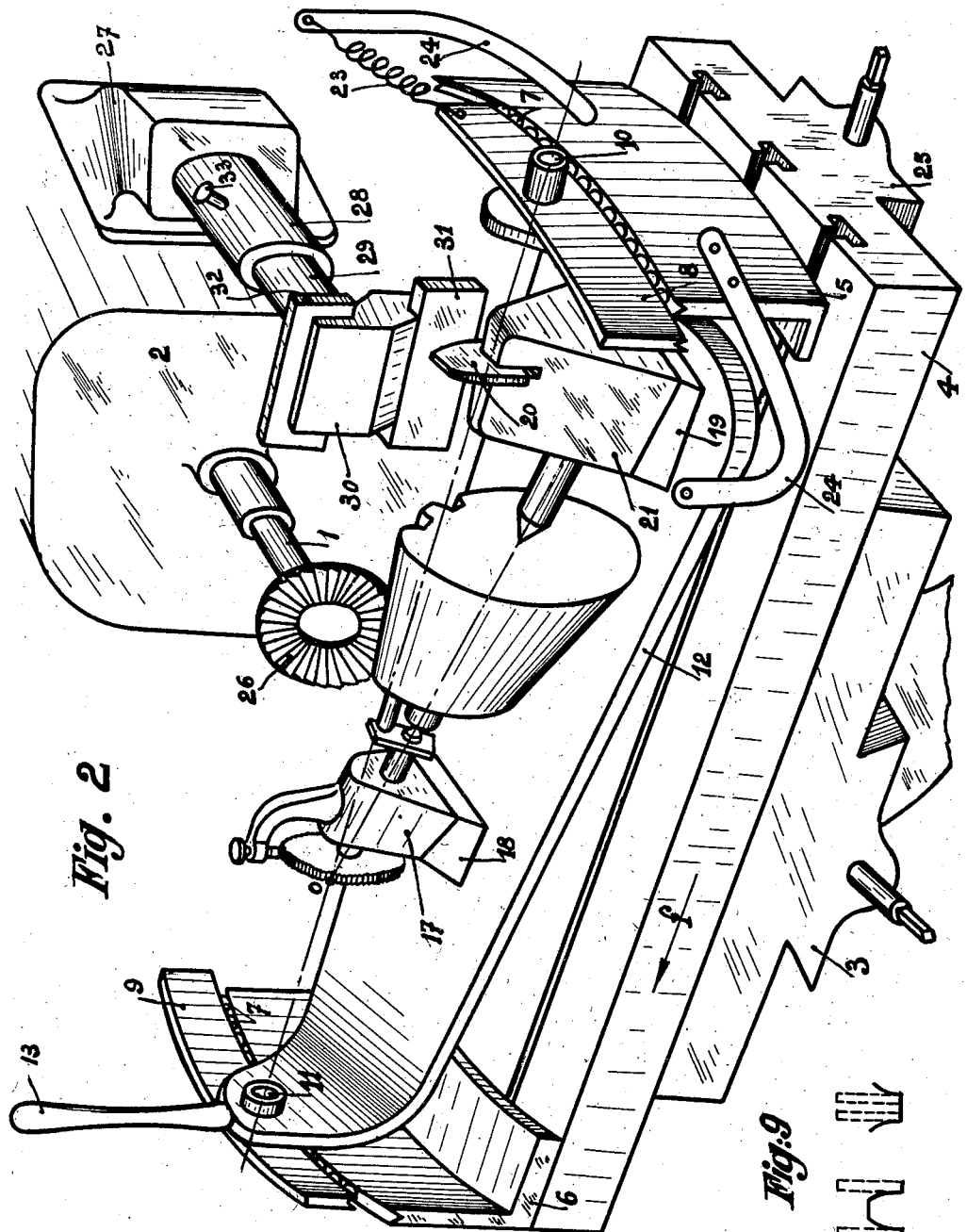

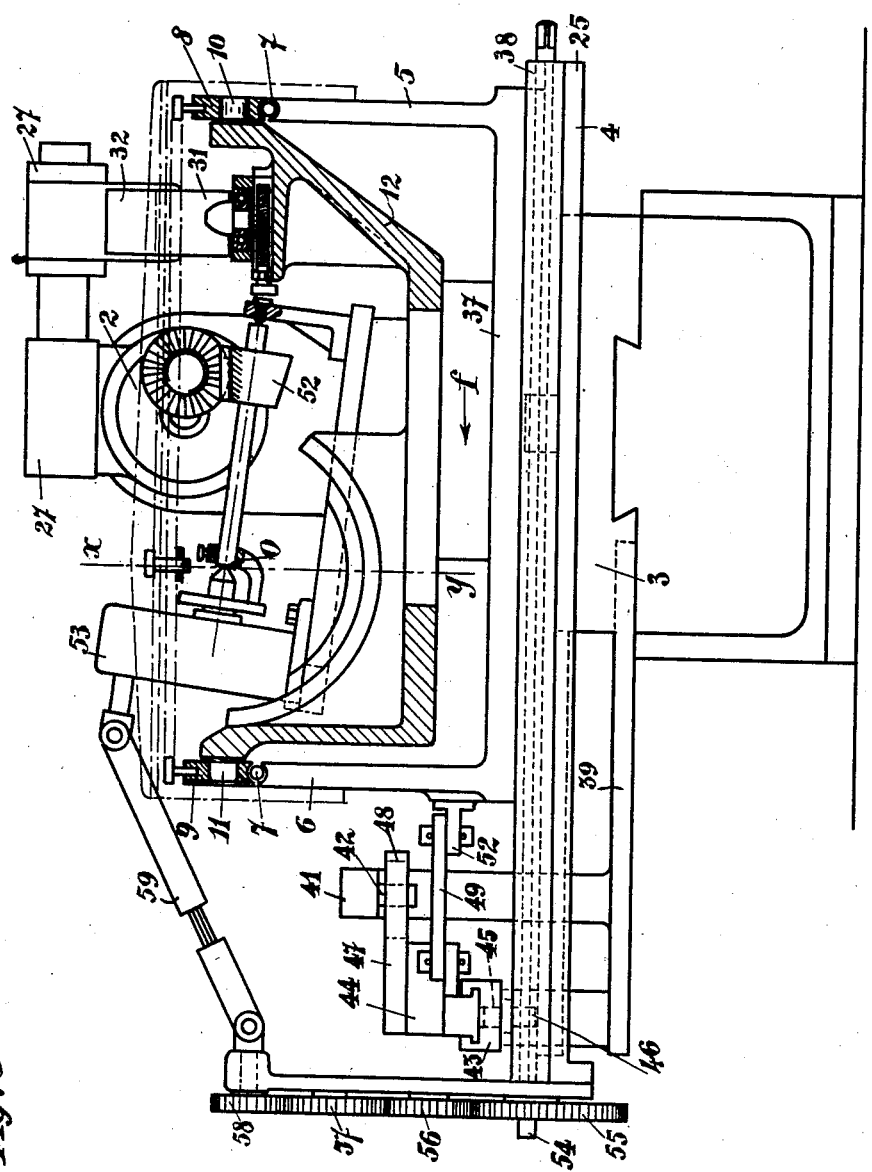

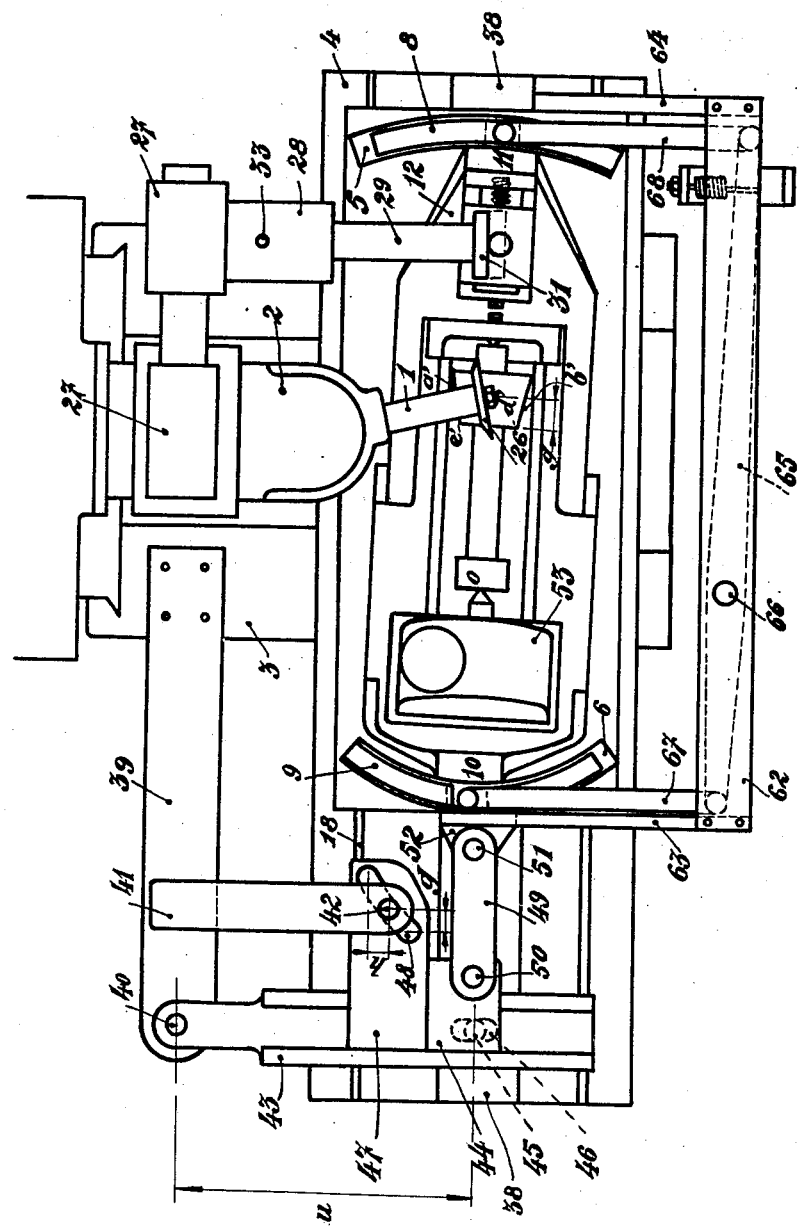

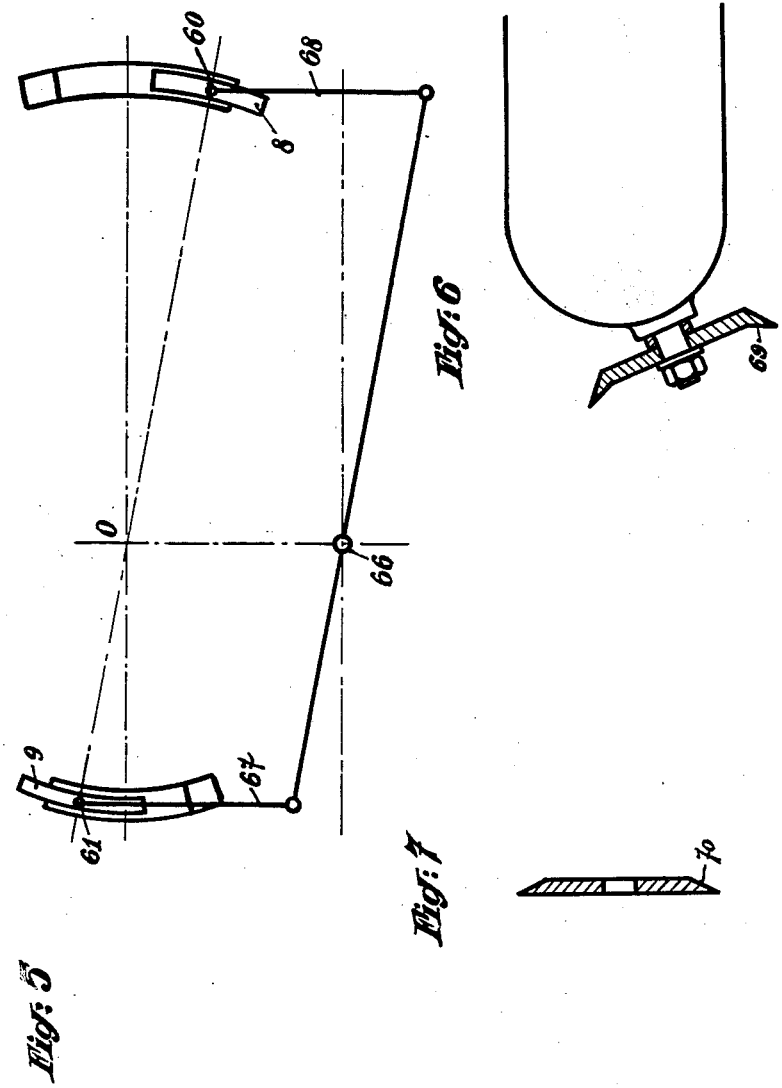

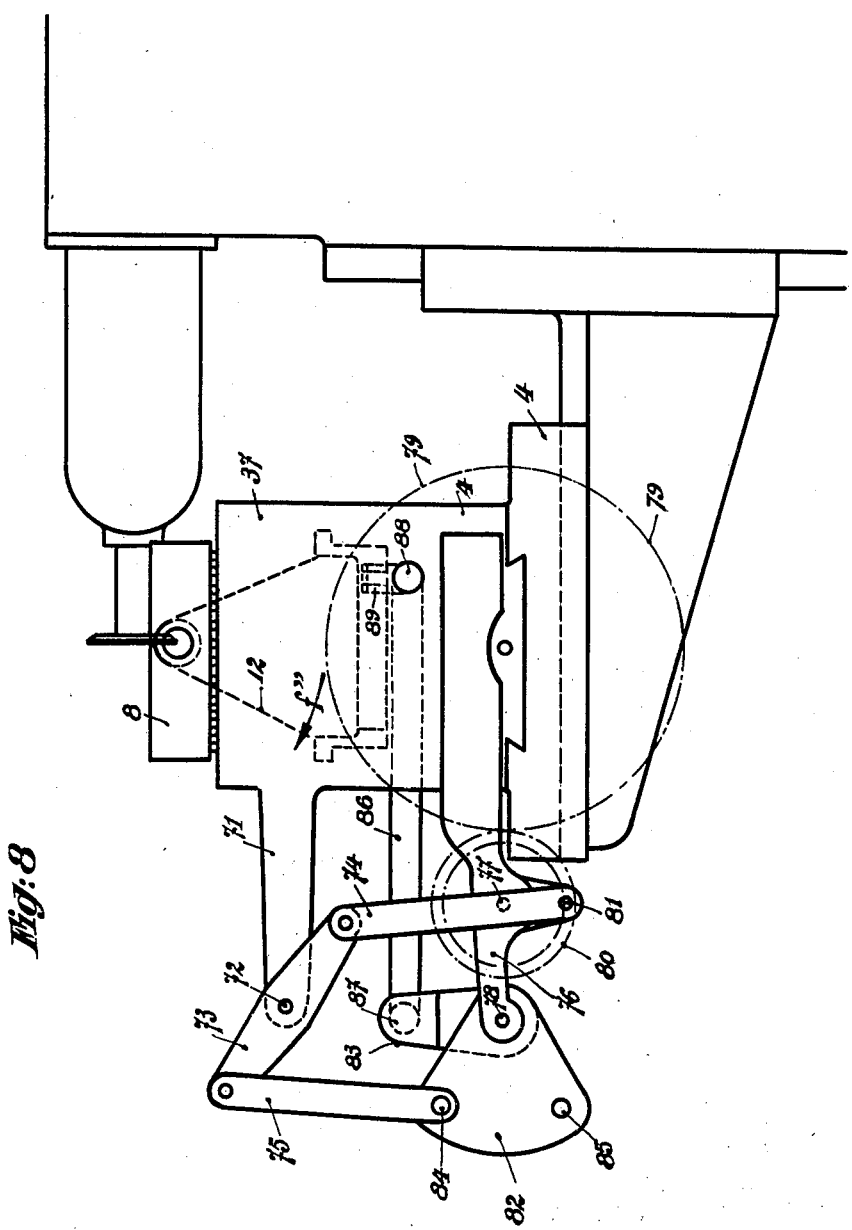

Patented Aug. 29, 1933

1,925,025

UNITED STATES PATENT OFFICE 1,925,025

PROCESS AND APPARATUS FOR ACCURATELY CUTTING AND RECTIFYING GEARS

Paul Emile Amann, Nanterre, France

Application May 25, 1932, Serial No. 613,539, and in France June 6, 1931

10 Claims. (Cl. 90—5)

My invention relates to the accurate cutting of cylindrical or bevel gear wheels of any type whatever, such as spur gearing, helical gearing, or spiral gearing. The object of my invention is to provide a method of performing that accurate cutting, and an apparatus for carrying out that process.

There exist gear cutting machines of all kinds, but the principles on which they work are so complicated that the known machines are expensive, heavy and cumbersome.

Mechanical engineering works of average importance generally need bevel gears, either of the rectilinear or of the spiral type, for the machines that they build. But the high price of the machines that are capable of cutting said gears, the room that they occupy and the special care that is required for operating them are out of proportion to the help that they can afford, and the solution of the problem must be found in another way.

The gears may for instance be ordered from specialized makers; but the latter are generally interested only by very large orders.

The gears may also be obtained by approximate cutting by means of a universal cutting machine. That method was the one that was generally used up to this time and was quite sufficient for low speeds of revolution of the gears thus cut. But with the higher and higher speeds of revolution that are now utilized, and as the progress of siderurgy make it obligatory to use steels which, when the piece has been machined must be hardened and then trued, it becomes necessary that conical and spiral gears may be accurately cut, and then trued after hardening.

The method of cutting gears that is the subject matter of the present application consists in making each tooth flank after flank in the same manner as in a copying lathe, by causing the gear to be cut to oscillate about an axis passing through the apex of the gear, on the one hand, and through a point located on the axis of symmetry of the cross section of the tooth, on the other hand. The oscillatory movement is controlled either manually or automatically by means of a guiding piece having a profile similar to the profile of the tooth and which is constantly maintained in contact with a fixed plane passing through the apex of the gear and the lower generatrix of the miller, or more generally of the tool.

Another object of my invention is to provide a gear cutting device for carrying out that process. The gear cutting device according to my invention may be adapted to milling machines of an ordinary type; it may be fitted with the dividing device that is generally used for cutting cylindrical gears, and it makes it possible to accurately cut and true bevel gears or cylindrical gears.

The gear cutting device according to my invention comprises an oscillating frame or support making it possible to reproduce in a homothetic manner on a bevel gear a given gear tooth profile, the cutting being performed by milling or grinding.

The oscillating support carries the piece of work so as to give it displacements corresponding to the profile to be reproduced, which profile is materialized by a guiding or profiling piece fixed to the support and the outline of which is homothetic with the profile of the gear tooth, the ratio of similitude being greater than 1. During these displacements, the piece of work moves in front of a milling or grinding tool which is tangentially disposed with respect to the generatrices of the cone of similitude.

That gear cutting device may be a part of a machine especially devised for that particular work, but it may also be adapted to existing machine tools such as milling machines or grinding machines for instance.

Preferred embodiments of my invention will be hereinafter described with reference to the accompanying drawings, given merely by way of example, and in which:

Fig. 2 is a perspective view of the gear cutting device as utilized for cutting a bevel gear on a milling machine, or for truing a bevel gear on a grinding machine;

Figs. 3 and 4 are respectively an elevational view and a plan view of the device according to my invention as applied to the cutting of a spiral bevel gear;

Fig. 5 is a diagrammatical view of the strengthening device;

Figs. 6 and 7 are detail views showing the forms of milling tools that may be used for cutting spiral bevel gears;

Fig. 8 is a diagrammatical view showing an embodiment of the automatic balancing by means of the automatic longitudinal movement of the table of the milling machine;

Fig. 9 shows a hollow profiling piece.

Figure 1:
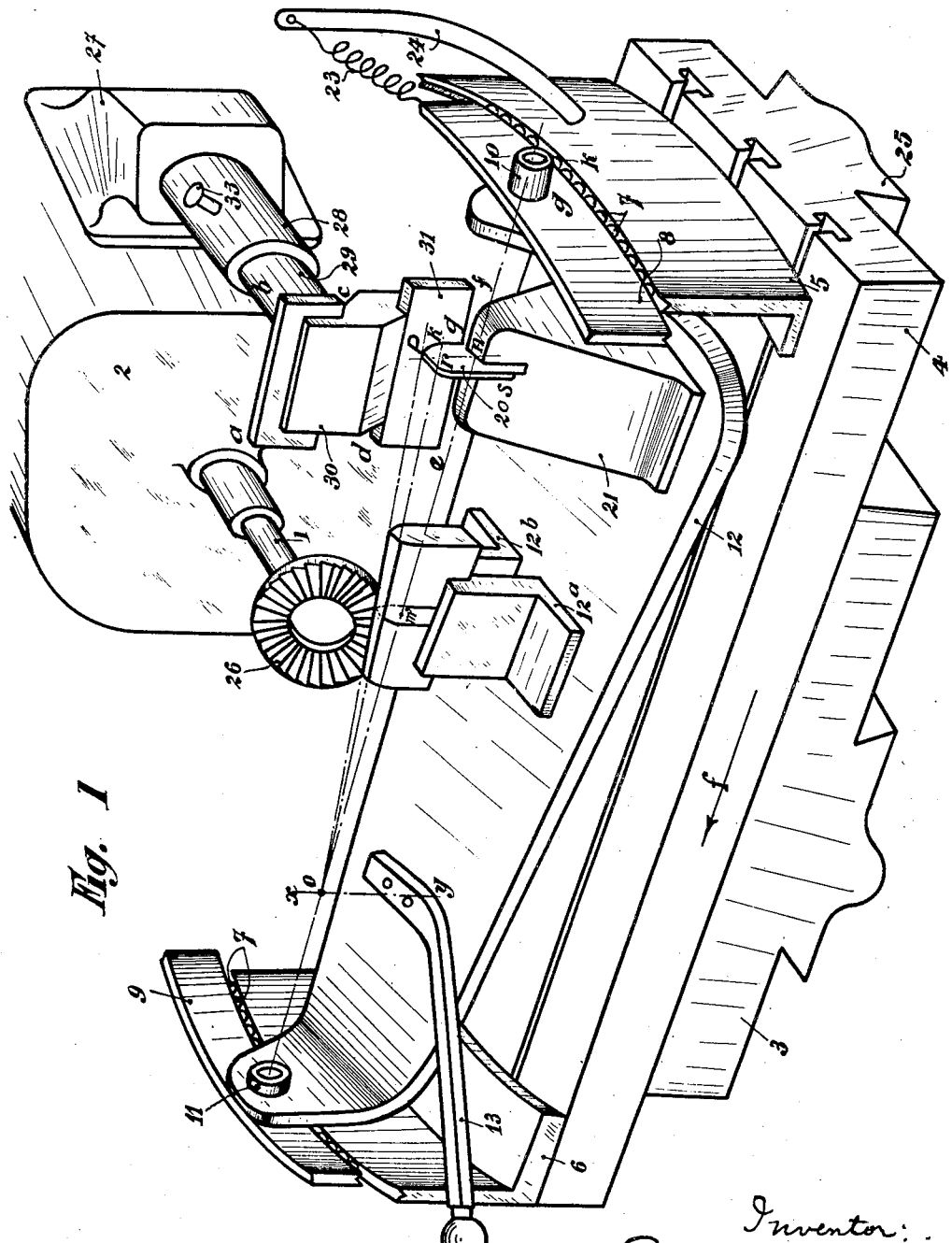
Fig. 1 is a perspective view of an oscillating support fitted on a milling machine, so as to reproduce in a homothetic manner a series of formers of gear-tooth profiles.

As shown in Fig. 1, the device according to my invention is fitted on a milling machine provided with a horizontal spindle 1 projecting from a milling head of any type whatever. Said milling machine further comprises a transverse carriage 3 and a longitudinal carriage 4 adapted to move along its slide 25.

The oscillating frame or support is mounted by means of two curved vertical members 5 and 6 on the top of which correspondingly curved rails or plates 8 and 9 are adapted to slide, with the interposition of rollers or balls 7 guided in corresponding roller-tracks respectively. Plates 8 and 9 are concentric and have their center at point 0, but their radii may be different, as shown in Fig. 1. A bent plate 12 of U-shaped longitudinal section and forming the oscillating support proper is provided with two sleeves 10 and 11 about which it oscillates without play. Said support is therefore swivelled about point 0. Said sleeves extend throughout curved plates 8 and 9 respectively, preferably in the middle part thereof. The oscillating displacement of plate 12 can be controlled manually, for instance by means of the handle of a lever 13.

The end of spindle 1 is provided with a milling tool 26 one cutting face of which is plane. On the fixed head of the milling machine that carries said spindle is fixed a support 27, the shape of which depends upon that of the head and which carries a barrel 28. A rod 29, the head 30 of which carries two flat plates 31 and 32 bolted thereto is slidably mounted in said barrel. Barrel 28 and rod 29 are provided with holes which can be brought in register, a pin 33 being then inserted in the registering holes so as to fix either plate 31 or plate 32 in the lower position. The faces $a\ b\ c$ and $d\ e\ f$ of plates 32 and 31 respectively are located in the same vertical plane and the whole is so adjusted that said plane may contain axis XY passing through point 0 (apex of the gear) and the plane of cut of the milling tool, or more generally the lower generatrix of the mill or of the tool.

A spring 23, which is either in tension or in compression, is so adjusted as to be in its neutral position when the axis 10, 11 of the oscillating support is located in the same vertical plane as plates 31, 32, which plane passes through point 0. For that position, marks $g$ and $h$, provided respectively on plate 10 and on member 5, are in register. Spring 23 is fixed, on the one hand to an arm 24 integral with member 5, and, on the other hand, to curved plate 8 upon which it exerts a tension or a pressure so as to cause frame or support 12 to rotate about center 0 in one direction or in the other.

Support 12 is pulled toward the front of the figure, so as to tension spring 23, and a profiling piece 20 is fixed, through a suitable support 21, on frame 12. It is then possible, by allowing spring 23 to act upon frame 12, and by simultaneously causing said frame to oscillate in a suitable manner, by means of handle 13, to successively bring all the points of one of the flanks of profiling piece 20 into contact with the surface of plate 31.

Considering a conical surface having its apex at 0, and the directrix of which is the flank of the profiling piece, it will be seen that any point of contact such as $k$ will correspond to the milling of a piece of work along generatrix $o\ k$ if table 4 of the milling machine is displaced in a direction parallel to the plane of plate 31, frame 12 being simultaneously kept in a fixed position with respect to the common axis of sleeves 10, 11.

Therefore, if carriage 4 is moved in a direction parallel to plate 31, and if support 12 is simultaneously caused to oscillate at a rate corresponding to that of said transverse movement, and with a determined amplitude, the milling tool will cut in the piece of work a conical surface having its apex at 0 and the directrix of which is the flank of the profiling piece 20.

The arrangement is particularly advantageous when the edges $a\ b$ and $e\ f$ of plates 32 and 31 are brought alternatively in the horizontal plane tangent to the lower part of the milling tool. To this effect, it is necessary that the axis 11—0—10 should intersect the axis of symmetry $m\ n$ of profiling piece 20 at the middle point $m$ of the basis thereof. As the convex profile $p\ k\ q$ is of any shape whatever, radii $m\ p$ and $m\ k$ are different in magnitude from $m\ q$. Therefore, during the displacement of support 12 for successively bringing points $k$ and $p$ into contact of plate 31, said support will be given a rotary displacement about point 0 which may be decomposed into two elementary displacements, first a rotation about the common axis of sleeves 11 and 10, and secondly a rotation about vertical axis $x\ y$.

Fig. 1 clearly shows how a profiling piece 20 can be used for the homothetic reproduction of its profile, which may for instance correspond to the shape of a gear tooth. The piece of work 34 is held between two angle pieces $12^a$ and $12^b$ secured (by means of bolts for instance) on oscillating support 12 on either side of plane $x\ y\ m$. When the reproduction of profile $p\ q$ has been effected, it will suffice, in order to obtain the reproduction of the symmetrical profile $r\ s$ to operate as follows:

The whole table 3—4 of the milling machine is lowered; pin 33 is removed; head 30 is turned upside down so that plate 32 is in the lower position; and pin 33 is again inserted in the corresponding holes of barrel 28 and rod 29. Spring 23 is then compressed by acting upon support 12 so as to apply the edge $r\ s$ of profiling piece 20 against face $a\ b\ c$ of plate 32 when table 3—4 of the milling machine is brought back to its upper position in which the horizontal plane passing through the basis of the profiling piece is tangent to the lower part of the milling tool.

The ratio of similitude between any profile, such as one having its center at $m'$ and the profile of the guiding piece whose center is at $m$ is $$\frac{0m'}{0m},$$

which is the characteristic of a bevel gear tooth.

Fig. 2 shows in a diagrammatic manner the application of the same principle to the accurate milling of a bevel gear. Owing to the provision of wedges 18 and 19 for supporting dividing-heads 17 and 21 respectively, the axis of the gear is inclined on the axis of sleeves 10 and 11 of support 12 at an angle equal to half the apex angle of the conical surface of the bottoms of the teeth. The gear will then be cut by combining the oscillatory movement of support 12 with the automatic longitudinal movement of the table of the milling machine, all the flanks located on one side of the teeth being first cut, and then the flanks located on the other side of said teeth.

If a truing wheel is disposed in place of the milling tool or in parallel relation with respect to the position of said milling tool, and said wheel is caused to rotate with a high speed of revolution, the hardened teeth of the gear can be rectified in the same manner.

In the above description I have explained how the reproduction of a profile can be obtained with a solid profiling piece, contact plates 31 and 32 being applied now on one side of the profiling piece now on the opposite side thereof. The principle of my invention is unchanged when use is made of a hollow profiling piece having two profiles disposed on either side of the axis of the profiling piece as shown in Fig. 9. In this embodiment of my invention it is necessary that the apex should be displaced by a distance equal to the thickness of the milling tool, and the two contact plates then form a parallelipipedon having a thickness equal to that of the milling tool.

Figs. 3 and 4 show the application of the cutting device according to my invention to the general case of an accurate milling of conical spiral gears. Figs. 1 and 2, which have been used for explaining the principle of my invention only concern particular cases of the general problem of the cutting of bevel gears.

It is known that the helical cutting of cylindrical gears is obtained by combining the longitudinal movement of the table of the milling machine with the suitable rotation of a dividing head integral with the gear to be cut, the ratio between the rates of movement of the table and of the dividing head being constant. Said mode of cutting gears is possible because the inclination of the milling tool that is tangent to the helix is constant.

The cutting of a conical spiral gear must produce a curve that is substantially analogous to an helix. As a matter of fact that curve corresponds to a straight line wound round a cone and as the radius decreases when moving in a direction parallel to the axis of the cone, it is necessary, in order that the milling tool may have a constant inclination, that the decreasing progression of the diameters should correspond with a proportional decreasing progression of the rectilinear displacements of the table since the milling tool works at the periphery of the gear.

Figs. 3 and 4 show, by way of example, an embodiment of the application of that principle to the gear cutting device of Figs. 1 and 2, in order to mill and to rectify accurately spiral bevel gears by means of a milling machine of the so-called universal type.

The two curved supporting members 5 and 6 are made in a single unit with a plate 37 (which does not form a part of the milling machine) and a key 38 is inserted in an ordinary groove of table 4 of the milling machine. The whole of frame 37—5—6 can then slide longitudinally on table 4.

A bracket 39 is fixed to the carriage 3 of the milling machine. At the end of said piece 39 is provided a pivot 40 and at the upper part of said bracket is fixed an arm 41 carrying a finger 42. A lever 43 provided with a T-shaped groove acts as a slide for a sliding piece 44 and is caused to rotate about pivot 40 by a stud 45 secured to its under face. The rotary movement of lever 43 is made possible owing to the provision of an elongated slot 46 in key 38.

Sliding piece 44 is provided at its upper part with a plate 47 in which is provided a slightly arcuate slot 48. For each type of gear to be cut there is a corresponding plate 47 and the shape and dimensions of the slot provided therein depend upon the characteristics of the developed spiral to be obtained.

The relative differential displacements of frame 37 with respect to those of table 4 are obtained through a connection between the variable angular movement of sliding piece 44 about pivot 40 (when table 4 pushes stud 45) and the movement of frame 37, by means of a connecting rod 49 for instance. Pin 50 connects rod 49 with sliding piece 44, and pin 51 connects said rod with frame 37 through piece 52.

It will readily be understood that the shape of slot 48 can be calculated in order to obtain for frame 37 a uniformly retarded motion interrelated with the uniform motion of table 4 in the same direction, for instance as said table is moving in the direction of arrow f.

The arcuate shape of slot 48 has for its purpose to compensate for the deforming movement due to the connecting rod 49 which, on account of its variable inclination, modifies the desired law of proportionality.

In order to permit the rotary movement of dividing head 53 and in order that the inclination of the piece of work may be possible, the following arrangement is cited by way of example.

At the end of the screw that serves to drive carriage 4 in a longitudinal direction, is provided a toothed wheel 55 meshing with a train of gears 56, 57, 58 for instance, the gear ratios being such that, in combination with the dividing head, said train of gears may impart to the gear to be cut the relative rotation that is required for the helical milling in question in the middle portion of the primitive frustum of cone. A double cardan extensibe shaft 59 allows the movement to take place in spite of the oscillations of the support.

It often happens that it is desired to reproduce a relatively large profile so as to obtain a homothetic profile that is very small because it is in the vicinity of the apex of the gear. If it is desired that the deforming couples due to the reactions of the contact plates and of the milling tool during the work may be without injurious effects, it is necessary to employ the following strengthening mechanism:

Curved plates 8 and 9 are each provided with a pivot 60 and 61 respectively and supporting members 5 and 6 carry a cross member 62 by their arms 63 and 64. A parallelogram consists of a lever 65 pivoted about point 66 of cross member 62 and two connecting rods 67 and 68 each articulated at one end to one of said curved plates 8 and 9 respectively and at the other end to the corresponding end of lever 65. The fourth side of the parallelogram is the line connecting the axes of sleeves 10 and 11. The fictive line 66—0 which is fixed in the space ensures the fixity of the position of centre 0 for all the positions of the apparatus.

The milling tools may be replaced by grinding wheels rotating with a higher speed of revolution, and the machine may then be employed for rectifying the gears that have been cut thereby.

The milling tools may have various profiles provided that the corresponding contact plates such as 31 and 32 have homothetic profiles. It is thus possible to reproduce gear teeth having curved flanks with an accuracy which is fully sufficient for practical purposes.

The theory as applied to plane milling tools is true whatever the ratio between the oscillatory movement and the feed motion may be. For practical purposes a plane milling tool leaves traces at the entrance of the teeth because its transverse reaction is not so great as its longitudinal reaction. A better result is obtained with a slightly conical milling tool, which leaves, for the finishing operation, merely the ridge parallel to the plane of the contact plate and containing the apex of the cone. That remark is also true in the case of the cutting of gears having convex or concave curved teeth.

In the first case (of convex teeth flanks) the arrangement of the head of the universal milling machine will be such as shown in Fig. 2, with milling tools having slightly conical edges and finishing their work through their vertical inner generatrix 69 (Fig. 6). In the second case (of concave teeth flanks), the milling tool will work through its convex side with its vertical generatrix 70 located in the plane of the contact plate (such as 31), Fig. 7.

The oscillatory movement of the support may be made automatic, by combining it with the longitudinal movement of the table, which itself is automatic.

The hereinafter described arrangement, which is given merely by way of example, has the advantage that it may be adapted to the longitudinal carriage or plate of the milling machine, and that it reduces the stress to which is subjected the screw of the carriage, due to the fact that during the oscillatory movement along one or the other flank it gives rise, at any moment, to substantially equal reactions.

Frame 37 carries an arm 71, at the end 72 of which is pivoted a lever 73 provided with two connecting rods 74 and 75 articulated therewith.

Carriage 4 is provided with another arm 76 in which are journalled two spindles 77 and 78.

The end of the screw through which the movement of the carriage is controlled carries a toothed wheel 79 of large radius, which meshes with another toothed wheel 80 of smaller radius and keyed on shaft 77. Said toothed wheel 80 carries a crank pin to which is articulated the end of connecting rod 74.

A sector shaped piece 82 provided with two holes 84 and 85 and carrying a lever 83 is keyed on shaft 78. The end of connecting rod 75 is articulated in one or the other of holes 84 and 85.

A horizontal rod 86 is provided at both ends with balls 87 and 88 one of which is connected, through a ball and socket joint, with the end of lever 83, while the other one, 88, is engaged in a jaw secured through bolts to the lower part of support 12.

When it is desired to obtain the oscillation of the support along one flank on the side f" of the vertical plane passing through the axis of the sleeves that carry said support, the end of rod 75 will be inserted in hole 84.

On the contrary, when it is desired to obtain the oscillation along the other flank, the end of rod 75 will be inserted in hole 85 and the support will be inclined on the opposite side.

The swivel connections 87 and 88 are intended to ensure the transmission of the oscillatory movement in spite of the declinations of support 12 rolling along its rails 8 and 9.

While I have described what I deem to be a preferred embodiment of my invention, it should be well understood that I do not wish to be limited thereto as there might be changes made in the arrangement, disposition and form of the parts without departing from the principle of my invention as comprehended within the scope of the appended claims. It is further to be understood that the terms "milling tool", "cutting portion" and the like, where used in the appended claims, are not to be taken as limiting the device specified therein to the operation of cutting gears, but as including the strictly analogous operation of rectifying or truing gears, as hereinbefore stated.

What I claim is:

1. In combination with a forming machine having a head, a forming tool rigidly carried by said head and a slidable carriage, a device for giving gears, and especially bevel gears an accurate profile, which comprises in combination, a rigid frame carried by said carriage, two curved rails adapted to rotate in said frame about a common center located in the some plane as the active portion of the forming tool, a support journalled in said rails about an axis passing through said center, means for fixing the piece of work to said support, a profiling piece rigidly fixed in said support substantially at right angles to said axis, and a contact plate rigidly supported by the head of the forming machine in such manner as to be in the same conical surface having its apex at said center as the active part of the forming tool.

2. In combination with a milling machine having a head, a milling tool rigidly carried by said head, and a slidable carriage, a device for accurately cutting gears and especially bevel gears, which comprises in combination, a rigid frame carried by said carriage, two curved rails adapted to rotate in said frame about a common center located in the same plane as the cutting portion of the milling tool, a support journalled in said rails about an axis passing through said center, means for securing the piece of work to said support, a profiling piece rigidly fixed to said support substantially at right angles to said axis and in symmetrical position with respect to a vertical plane passing through said axis, elastic means adapted to act in opposite directions for bringing back said rails into a mean position with respect to said frame, and a contact plate rigidly supported by the head of the milling machine in such manner as to be in the same conical surface, having its apex at said center, as the cutting part of the milling tool.

3. In combination with a milling machine having a head, a milling tool rigidly carried by said head, and a slidable carriage, a device for accurately cutting gears and especially bevel gears, which comprises in combination, two curved members carried by said carriage having a common center located in the same vertical plane as the cutting portion of the milling tool, two curved rails of the same shape as said members respectively and adapted to slide thereon, two cylindrical sleeves extending throughout said rails and disposed in line with each other, a support pivoted about said sleeves, the common axis of said sleeves being located in the same vertical plane as said center, means for securing the piece of work to said support, a profiling piece rigidly fixed to said support substantially at right angles to said axis and in symmetrical position with respect to said vertical plane, a lever fixed to said support for controlling the position thereof, elastic means adapted to act in opposite directions for bringing back said rails into a mean position with respect to said curved members, and a contact plate rigidly supported by the head of the milling machine having a plane surface located in the same plane as said center and the cutting portion of the milling tool, adapted to cooperate with said profiling piece.

4. In combination with a milling machine having a head, a milling tool rigidly carried by said head, and a slidable carriage, a device for accurately cutting gears and especially bevel gears which comprises in combination, a contact plate having a surface parallel both to the cutting face of said cutting tool and to the direction of displacement of said carriage, a support, universal suspension means for connecting said support with said carriage, the center of said suspension being in the same plane as said contact plate, a profiling piece rigidly secured to said support adapted to cooperate with said contact plate, means for securing a piece of work to said support substantially in line with said profiling piece and with said center and means for controlling the displacements of said support.

5. In combination with a milling machine having a head, a milling tool rigidly carried by said head, and a slidable carriage adapted to move in a direction parallel to the cutting face of said milling tool, a device for accurately cutting gears and especially bevel gears having spiral teeth, which comprises, a contact plate parallel to the cutting face of said milling tool, a support, universal-suspension means for connecting said support with said carriage, the center of said suspension being in the same plane as said contact plate, a profiling piece rigidly secured to said support adapted to cooperate with said contact plate, means for rotatably supporting the piece of work on said support, means for rotating said piece of work with respect to said supporting means, and means for controlling the displacement of said support.

6. In combination with a milling machine having a head, a milling tool rigidly carried by said head, and a slidable carriage adapted to move in a direction parallel to the cutting face of said milling tool, a device for accurately cutting bevel gears having spiral teeth which comprises, a contact plate rigidly carried by said head and having a surface parallel to the cutting face of said milling tool, a support, universal suspension means for connecting said support with said carriage, the center of said suspension being in the same plane as the surface of said contact plate, a profiling piece rigidly secured to said support adapted to cooperate with said contact plate, a dividing head for supporting the piece of work mounted on said support, means for rotating said dividing head, means for controlling the displacement of said support about said center, and means for causing said support to move in the direction of displacement of said slidable carriage with a uniformly retarded movement, in relation with the rotation of said dividing head.

7. In combination with a milling machine having a head, a milling tool rigidly carried by said head, and a slidable carriage adapted to move in a direction parallel to the cutting face of said milling tool, a device for accurately cutting bevel gears having spiral teeth, which comprises, a contact plate rigidly carried by said head and having a surface parallel to the cutting face of said milling tool, a support, universal suspension means for connecting said support with said carriage, the center of said suspension being in the same plane as said surface of the contact plate, a profiling piece rigidly secured to said support adapted to cooperate with said contact plate, a dividing head for supporting the piece of work mounted on said support, means for controlling the displacement of said support about said center, a screw for controlling the displacement of said carriage, a gear train meshing with said screw for rotating said dividing head, and means for connecting said support with said carriage so that said support is driven by said carriage with a uniformly retarded motion.

8. In combination with a milling machine having a head, a milling tool rigidly carried by said head, and a slidable carriage adapted to move in a direction parallel to the cutting face of said milling tool, a device for accurately cutting gears and especially bevel gears, which comprises, a contact plate rigidly carried by said head and having a surface located in the same plane as the cutting face of said milling tool, universal suspension means for connecting said support with said carriage, the center of said suspension being in the same plane as said surface of the contact plate, a profiling piece rigidly secured to said support adapted to cooperate with said contact plate, means for securing said piece of work to said support, means for driving said carriage, a crank pin operatively connected with the last mentioned means, and a system of jointed rods operatively connected with said crank pin for causing said support to oscillate about its center of suspension.

9. A device according to claim 3, further comprising two parallel rods of equal length pivoted to said rails respectively at point thereof located on the same vertical lines as the axes of said sleeves, and a third rod articulated to the free ends of said rods and pivoted to a fixed point of the machine.

10. A device according to claim 2 in which the contact surface and the cutting faces of the milling tool are of homothetic shapes.

PAUL EMILE AMANN.